April 6, 1926.　　　　　　　　　　　　　　　　1,579,813
F. M. HARGREAVES
ANTISKID CHAIN
Filed July 7, 1924
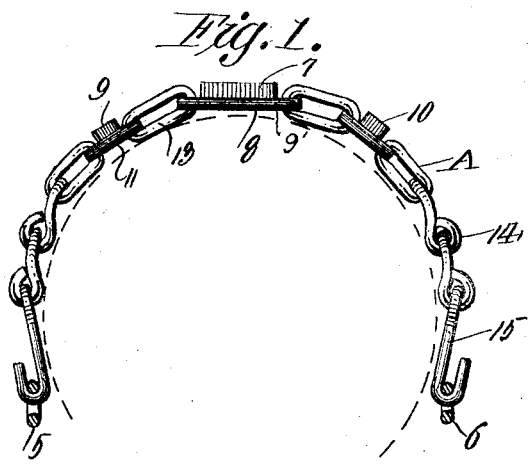
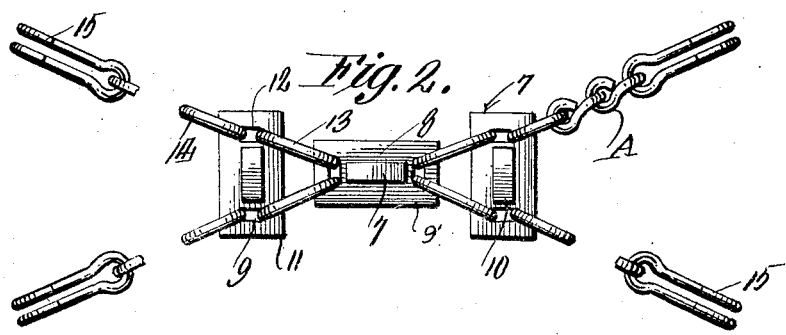
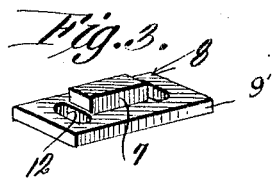
WITNESSES
Inventor
FREDERICK M. HARGREAVES
By
Attorney Patented Apr. 6, 1926.

1,579,813

UNITED STATES PATENT OFFICE.

FREDERICK M. HARGREAVES, OF CARTERVILLE, ILLINOIS.

ANTISKID CHAIN.

Application filed July 7, 1924. Serial No. 724,664.

*To all whom it may concern:*

Be it known that I, FREDERICK M. HARGREAVES, a citizen of the United States, residing at Carterville, in the county of Williamson and State of Illinois, have invented certain new and useful Improvements in Antiskid Chains, of which the following is a specification.

This invention relates to automobile appliances and more particularly to anti-skid chains which are particularly adapted for pneumatic tires of the balloon type, but which are susceptible for use with other types of tires.

The primary object of the invention is to provide an anti-skid chain which will not press into the tire, thereby preventing injury to the tire and assuring the effectiveness of the chain at all times.

A further object of the invention is to provide an anti-skid device embodying traction lugs arranged in transverse alignment across the tread of the tire, said lugs being adapted to extend the full width of the tread so as to assure the effective gripping of the roadway under all conditions.

A further object of the invention is to provide an anti-skidding chain embodying a plurality of anti-skid lugs incorporated with the chain, the lugs including flat bases for engaging a relatively large area of the tire surface for preventing injury of the tire by the lugs and for preventing the lugs from being pressed up into the tire, so that the road gripping qualities thereof will not be lost.

A still further object of the invention is to provide an improved device of the above character, which will be durable and efficient in use, one that will be simple and easy to manufacture and one which can be placed upon the market at a small cost.

With these and other objects in view the invention consists in the novel construction, arrangement and formation of parts, as will be hereinafter more specifically described, claimed and illustrated in the accompanying drawings, in which drawings, Figure 1 is a transverse section through the improved anti-skid chain, the cross chains and anti-skid lugs being shown in edge elevation, Figure 2 is a top plan view of the cross chains and the novel anti-skid lugs, Figure 3 is a detail perspective view of one of the novel anti-skid lugs, Figure 4 is a detail perspective view of one of the hooks carried by one of the transverse chains for engaging the circumferentially extending side chains of the device.

Referring to the drawings in detail wherein similar reference characters designate corresponding parts throughout the several views, the letter A generally indicates the improved anti-skid chain which comprises circumferentially extending side chains 5 and 6 which can be of any preferred character and connected in place in any desired way. The circumferentially extending side chains 5 and 6 are connected at equi-distantly spaced points by the transversely extending road gripping members 7.

Each of the road gripping members 7 embodies a centrally disposed road gripping lug 8 which includes a flat oblong shaped base plate 9 which is adapted to engage the tread of the tire for preventing the lug from pressing too far into the tire. As shown the flat base plate 9' extends transversely of the tire and has arranged at each end thereof road gripping lugs 9 and 10. These lugs 9 and 10 extend longitudinally of the tire and are formed on the outer faces of flat elongated base plates 11 which are adapted to engage the tire. The base plates 9' and 11 of the lugs 8, 9 and 10 have formed therein adjacent to the terminals thereof slots 12 and the base plates 11 of the lugs 9 and 10 are connected to the terminals of the base plate 9' of the lug 8 by diagonally extending links 13 which extend through the slots 12.

In order to permit the connecting of the lugs 9 and 10 with the circumferentially extending side chains 5 and 6 diagonally extending chains 14 are secured to the base plates 11 as clearly shown in Figures 1 and 2. The outer ends of the diagonally extending chains 14 carry hooks 15 which are adapted to engage links of the side chains 5 and 6.

By referring to Figure 2 of the drawing it will be noted that as the lug 8 extends transversely of the tread of the tire that the same will form an effective tractive means while the lugs 9 and 10 extending circumferentially of the tire will prevent lateral skidding.

From the foregoing description is can be seen that I have provided a novel anti-skid chain which is particularly adapted for balloon tires but which can be effectively used on the ordinary type of high pressure tires, the device being so arranged as to prevent lateral skidding of the tires over a road way and to permit the firm gripping of the road.

Changes as in detail may be made without departing from the spirit or the scope of this invention, but,

What I claim as new is:—

An anti-skid device comprising an elongated plate adapted to extend transversely of the crest of a pneumatic tire shoe and provided with openings in its ends, a pair of elongated plates adapted to be positioned upon opposite sides of the crest of the tire, such plates being spaced from the ends of the plate first mentioned, ground engaging element formed on all of the plates, and elements connecting all of the plates together, and means for securing said pair of plates in position on a tire.

In testimony whereof I affix my signature.

FREDERICK M. HARGREAVES.